United States Patent [19]
Dupoyet

[11] Patent Number: 4,642,078
[45] Date of Patent: Feb. 10, 1987

[54] TRANSMISSION CHAIN

[75] Inventor: Guy Dupoyet, St. Laurent, France

[73] Assignee: Compagnie des Transmissions Mecaniques Sedis, Levallois-Perret, France

[21] Appl. No.: 761,706

[22] Filed: Aug. 2, 1985

[30] Foreign Application Priority Data

Aug. 3, 1984 [FR] France .................. 84 12358

[51] Int. Cl.$^4$ .................................. F16H 13/02
[52] U.S. Cl. ............................ 474/206; 474/231
[58] Field of Search ............ 474/206, 232, 226, 231, 474/212, 213, 219; 59/82, 84

[56] References Cited

U.S. PATENT DOCUMENTS 4,265,134 5/1981 Dupoyet .................. 474/231
4,428,739 1/1984 Shimano ................... 474/231

FOREIGN PATENT DOCUMENTS 2428769 6/1978 France .
530186 6/1939 United Kingdom .
830700 3/1957 United Kingdom .

Primary Examiner—Stephen J. Novosad
Assistant Examiner—Thuy M. Bui
Attorney, Agent, or Firm—Burns, Doane, Swecker & Mathis

[57] ABSTRACT

This invention makes it possible to produce a chain having a particularly small overall width, while able to operate with sprockets having a customary tooth thickness. This result is obtained in particular by providing for the inner plates (10) to be deformed, in their end zones (12), on both faces and to delimit projecting portions (16c) directed towards the interior of the chain, these projecting portions thus being separated by a distance ($d_1$) smaller than the thickness of the teeth of the sprockets with which the chain is to cooperate.

11 Claims, 4 Drawing Figures

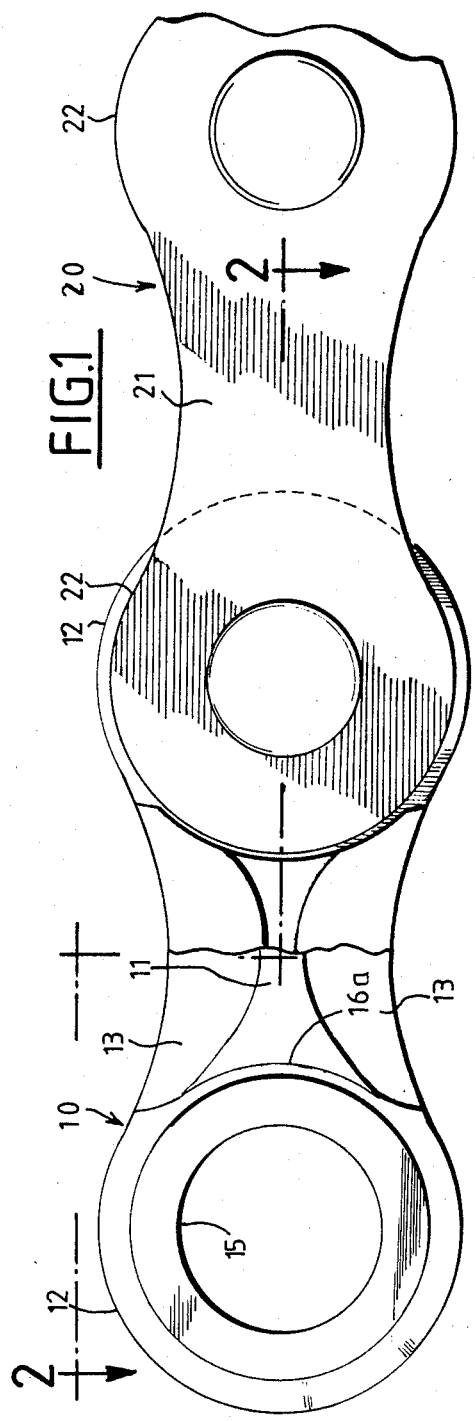
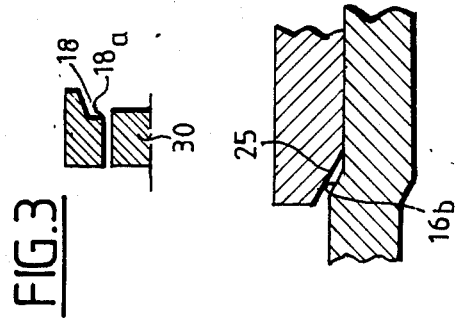
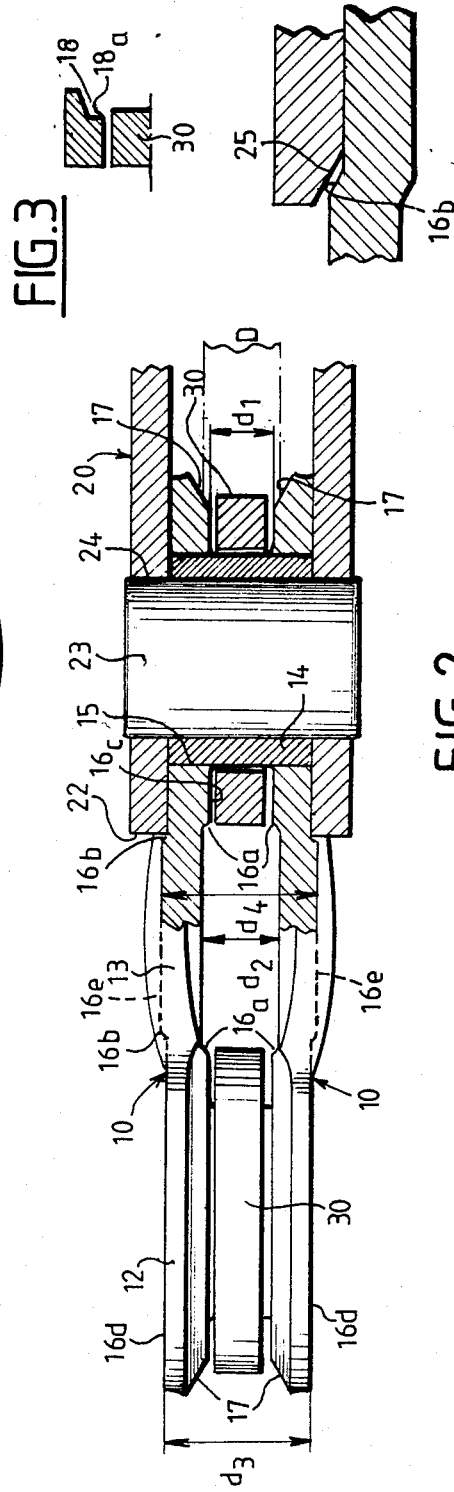

TRANSMISSION CHAIN

BACKGROUND OF THE INVENTION

The present invention relates to transmission chains, particularly roller chains adapted to be used on cycles or for other applications.

Chains of this type comprise alternate inner and outer links which are articulated to one another, each link being composed of two parallel plates. In a first type of chain (GB-A No. 830 700) the plates of the inner links are connected together by bushes in which turn solid or hollow pins fixed between the two plates constituting the outer links. In another type of chain (FR-A No. 2428769) the plates constituting the inner links are provided on their opposite faces with tubular studs or barrels in which pass the pivot pins connecting these inner links and the outer links. The plates constituting the outer links may also be provided with tubular studs on their opposite faces. These two types of chain are generally completed by rollers disposed, as the case may be, around the bushes connecting the inner plates or around the hollow studs of these same plates of the inner links.

In the different chains already known the width of the chain or its lateral dimension, in a direction perpendicular to its axis or, in other words, in a direction parallel to the pivot pins between the links, is determined in the following manner: the distance between the two opposite faces of the plates forming the inner links must be at least equal to the thickness of the teeth which are to engage between these two plates. To this basic distance are added:

the functional clearances between the inner faces of the inner plates and these teeth, the thickness of the two plates constituting an inner link;

the functional clearances between the plates of the inner links and the plates of the outer links and also, in certain cases, the projection of the bushes extending between the two plates of the inner link and possibly projecting from the outer faces of these plates;

the thickness of the two plates constituting the outer link;

where applicable, any projection of the pivot pins or outward offset of the outer plates in the zone of the pivot pins.

However this may be, in all existing chains the distance separating the plates constituting an inner link, whether in the central zone of these plates or in their end zones where the pins are situated, is always greater than the thickness of the teeth of the sprockets with which the chain has to cooperate, this thickness being measured at the roots of the teeth of these sprockets.

The result is that the thickness of chains in the direction of the pivot pins between the links cannot be less than a certain value, and this, particularly in their application to derailleur transmissions for cycles, has the consequence of limiting the number of sprockets which the freewheel may comprise, and consequently the number of gear ratios of the cycle thus equipped.

The present invention seeks to provide a chain which, while permitting operation with sprockets having a determined tooth thickness, have smaller dimensions and in particular snaller transverse width than known chains.

It therefore has as its object a transmission chain of the type comprising inner links consisting of two inner plates disposed parallel, outer links articulated on the inner links and consisting of two outer plates likewise disposed parallel, the inner plates and the outer plates comprising a central zone and two end zones where the pivot pins are disposed, the inner plates being deformed in their end zones on both their faces and delimiting projecting portions directed towards the interior of the chain, this chain being characterized in that said projecting portions are separated by a distance less than the minimum distance between the central zones of the inner plates and less than the thickness of the roots of the sprocket teeth with which the chain has to cooperate.

According to other characteristics:

the chain being of the type comprising rollers disposed around each articulation between inner links and outer links, the inwardly projecting portions extend over a zone whose diameter corresponds approximately to that of the rollers;

said projecting portions delimit, in the zone adjoining the central zone, a portion of surface adjacent the periphery of the rollers and adapted to serve as support surface for the teeth of the sprockets, the inner plates have an undercut along the inner edges of their end zones or portions;

this undercut is in the form of a bevel preferably extending between two approximately concentric arcs of circles having, in the one case, a radius smaller than that of the roller and, in the other case, a radius greater than that of this roller;

the rollers have a thickness substantially smaller than the space between the central zones or portions of the inner plates.

The invention will be described in greater detail below with reference to the accompanying drawings, which are given solely by way of example and in which:

BRIEF DESCRIPTION OF THE DRAWINGS

FIG. 1 is a side view in elevation of a part of an inner plate and of part of an outer plate of a bushed roller chain according to the invention, FIG. 2 is a top plan view partly in section on the line 2—2 in FIG. 1;

FIGS. 3 and 4 are detail views in section of two variants.

DETAIL DESCRIPTION OF THE DRAWINGS

In the drawings, particularly in FIGS. 1 and 2, can be seen a part of a chain according to the invention, of which only one inner link and a part of an adjacent outer link are shown.

The inner link comprises two plates 10, known as inner plates, each composed of a central zone or portion 11 and two rounded end zones or portions 12, the the central portion having, in accordance with FIG. 1, a height less than the height and diameter of the two end portions. In addition, as is known, each of the two inner plates is deformed outwards in its central portion, along its two edges at 13, as described in the Applicants' previous patent FR-A No. 77 20 793 (U.S. Pat. No. 4,265,134).

The two plates of an inner link are connected together by two bushes 14 received in cylindrical housings 15 provided in the end zones of the plates.

An outer link is composed of two plane parallel plates 20 which in side elevation have the same general shape as the plates of the inner links, as can be seen in FIG. 1, so that they also comprise a central portion 21 and two rounded end portions 22. As is known, the two outer plates constituting an outer link are connected together by two pins 23 received in sockets 24 provided in the end portions of the outer plates, these pins turning in the bushes 14.

The chain is completed by rollers 30 disposed around the bushes 14.

The above description corresponds to the characteristics common to the chain according to the invention and a conventional chain. The original characteristics of this chain will now be described.

As can be seen in FIG. 2, the inner plates 10 are deformed in such a manner that their end portions are offset towards the interior of the chain, thus forming an inwardly directed step 16a, 16b on each of the two inner and outer faces of these plates. The opposite faces 16c of the end zones 12 of the inner plates are thus separated by a distance $d_1$ less than the thickness D of the roots of the teeth of the sprockets (not shown) P over which the chain is to pass, and less than the distance $d_2$ between the central portions 11 of the plates 10.

On the other hand, these central portions 11 of the inner plates are not substantially modified and in particular the distance $d_2$ separating the two inner surfaces facing one another is determined in dependence on the thickness of the teeth of the sprockets with which the chain is to cooperate.

Similarly, the distance $d_3$ separating the outer faces 16d of the end portions of the inner plates is less than the distance $d_4$ between the outer faces 16e of the central portions of these plates.

On the outer faces of the inner plates in the connecting area between the central zone and the end zones, the inwardly deformed zone is delimited by an arc of a circle of a radius slightly greater than the radius of the end zone of an outer plate, which is thus partly received in the step 16b thus formed.

On the inner face this step is likewise delimited, in the zone 16a connecting to the central zone, by an arc of a circle of a diameter approximately equal to or smaller than that of the roller, so as to be able to serve as support surface for the teeth of the sprockets. The roller has a substantially smaller thickness than in known chains, for example of the order of 1.3 to 1.4 mm instead of 2 mm in previous chains, so that it may be composed of a washer which can be cut out of a sheet metal blank; this may constitute an important advantage in respect of precision and manufacturing costs.

According to another characteristic the plates constituting the inner links are provided, along the inner edges of their end zones, with undercuts 17, which are in the form of bevels in the example shown in FIG. 1, the inner edge of these undercuts preferably extending along an arc of a circle of a radius smaller than that of the roller, while the outer edge extends along an arc of a circle of a diameter greater than that of the roller.

In a variant, the inner edges of the end zones of the inner plates may have a shape different from the bevelled shape shown in FIG. 2, and may for example have the shape of an approximately right-angled step, as shown at 18 in FIG. 3. In this case the radius of the portion 18a of the step is equal to or smaller than that of the roller 30.

According to another characteristic, which can be clearly seen in FIG. 1, the plates of the inner links have, in their end zones, a diameter greater than that of the outer plates.

The chain that has just been described has the following advantages:

because of the inward offsetting of the end zones of the inner plates, use is made of rollers of reduced thickness which can be cut from sheet metal blanks and consequently are easier and less expensive to manufacture, for a determined or customary tooth thickness D, that is to say without modification of the sprockets with which the chain cooperates, the thickness of the chain can be substantially reduced and may for example be of the order of 10% less than in a conventional chain, which is a considerable reduction achieved without reducing the thickness of the metal constituting the plates, both in the case of the inner and of the outer plates, and therefore without reducing the transmission power capacity. In the case of a derailleur transmission for a cycle, this advantage means that it is possible to add an additional sprocket to the freewheel while retaining the same lateral dimensions, so that the user has an additional gear ratio;

the presence of a bevel 17 or step 18 along the inner edges of the end zones of the inner plates provides a widened entry for the teeth, thus giving an important advantage in respect of operation by facilitating entry and improving guidance of the chain on the teeth, this obviously being achieved without increasing the lateral dimensions;

the reduction of section along the edges of the end zones of the inner plates is compensated by an increase of diameter, thus making it possible to retain sufficient material to withstand tensile forces. This same characteristic can be utilized for the outer plates, as shown in the variant illustrated in FIG. 4, where the outer plate extends, by means of an edge 25 of progressively decreasing section, beyond the step 16b of the inner plate.

The invention can obviously be applied under the same conditions and with the same advantages to a chain in which the bushes connecting the plates of the inner links are replaced by cylindrical barrels or studs integral with these plates.

In a general way the invention can be applied to any type of transmission chain whether or not it is provided with rollers, and the rollers may be made by any suitable process.

What is claimed is:

1. A transmission sprocket chain of the type comprising inner links consisting of two inner plates disposed parallel, outer links articulated on the inner links and likewise consisting of two outer plates disposed parallel to each other and parallel to said inner plates, the inner plates and the outer plates each defining a central zone and two end zones, the inner plates having inner and outer faces, being deformed in their end zones on both their faces so as to define projecting portions directed towards the interior of the chain, the outer plates of each outer link being connected by two pivot pins extending between the end zones of the inner plates, wherein said inner faces of the inner plates are separated by a distance less than the minimum distance between the central zones of the inner plates and less than the thickness of the roots of the teeth of the sprockets with which the chain has to cooperate.

2. A transmission chain as claimed in claim 1, comprising rollers disposed around each articulation between inner links and outer links, wherein the inwardly projecting portions extend over a zone whose diameter corresponds approximately to that of the rollers.

3. A transmission chain as claimed in claim 2, wherein the said projecting portions define, in the zone adjoining the central zone, a portion of surface adjacent to the periphery of the rollers and adapted to serve as support surface for the teeth of the sprockets.

4. A transmission chain as claimed in claim 2, wherein the rollers have a thickness substantially smaller than the space between the central zones or portions of the inner plates.

5. A transmission chain as claimed in claim 4, wherein the rollers are washers cut out of a metal sheet.

6. A transmission chain as claimed in claim 1, wherein the inner plates have an undercut along the inner edges of their end zones or portions.

7. A transmission chain as claimed in claim 6, wherein this undercut has the shape of a bevel.

8. A transmission chain as claimed in claim 7, wherein said bevel extends between two approximately concentric arcs of circles having, in the one case, a radius smaller than that of the roller and, in the other case, a radius greater than that of said roller.

9. A transmission chain as claimed in claim 6, wherein the undercut is in the form of an approximately right-angled step.

10. A transmission chain as claimed in claim 1, wherein the end zones of the inner plates extend radially beyond the end zones of the outer plates.

11. A transmission chain as claimed in claim 1, wherein the outer plates have, in their end zones, edges of progressively decreasing section which extend beyond the steps of the inner plates.

* * * * *